United States Patent Office 2,864,837
Patented Dec. 16, 1958

2,864,837
ORGANIC COMPOUNDS AND PROCESS

Oldrich K. Sebek, George B. Spero, and John L. Thompson, Kalamazoo, Mich., assignors to The Upjohn Company, Kalamazoo, Mich., a corporation of Michigan No Drawing. Application February 19, 1958
Serial No. 716,035

5 Claims. (Cl. 260—397.45)

The present invention relates to steroid compounds and is more particularly concerned with 6α-methyl-11β,16α-dihydroxyprogesterone, 6α-methyl-16α-hydroxy-11-ketoprogesterone, the 16-acylates thereof, and a process for the production thereof.

The new compounds and the process of the present invention are illustratively represented by the following formulae:

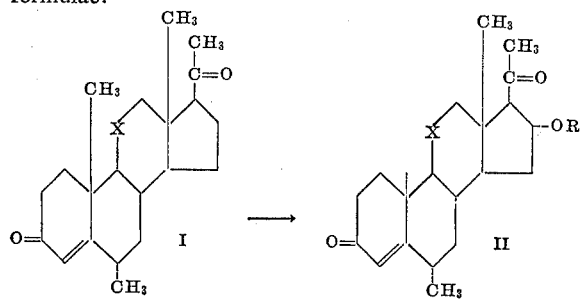

wherein X is selected from the group consisting of the carbonyl radical (>C=O) and the β-hydroxymethylene radical

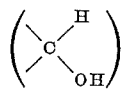

and R is selected from the group consisting of hydrogen and the acyl group of an organic carboxylic acid, preferably a hydrocarbon carboxylic acid containing from one to twelve carbon atoms, inclusive.

The new compounds of the present invention, 6α-methyl-11β,16α-dihydroxyprogesterone, 6α-methyl-16α-hydroxy-11-keto-progesterone, and the 16-acylates thereof, show anti-inflammatory activity and are useful in treatment of arthritic diseases of the joints, in the form of tablets and injectables. They are also useful for the treatment of inflammatory conditions of the skin when administered in the form of topical ointments and lotions, and of the eyes, ears and nose in the form of drops, nasal sprays, and ointments. The new compounds also have diuretic activity and salt-losing properties which make them useful in the alleviation of edematous conditions resulting from the excessive retention of salt and water.

It is an object of the present invention to provide 6α-methyl-11β,16α-dihydroxyprogesterone (6α - methyl-11β,-16α-dihydroxy-4-pregnene-3,20-dione), 6α - methyl - 16α-hydroxy-11-ketoprogesterone (6α-methyl-16α-hydroxy-4-pregnene-3,11,20-trione), and the 16-acylates thereof, wherein the acyl group is that of a hydrocarbon carboxylic acid containing from one to twelve carbon atoms, inclusive. It is another object of the instant invention to provide a process for the preparation of 6α-methyl-11β,16α-dihydroxyprogesterone, 6α - methyl-16α-hydroxy-11-keto-progesterone and the 16-acylates thereof. Other objects of this invention will be apparent to those skilled in the art to which this invention pertains.

The starting compounds of the present invention are 6α-methyl-11-ketoprogesterone [Spero et al., J. Am. Chem. Soc. 78, 6213 (1956)], and 6α-methyl-11β-hydroxyprogesterone, obtained in accordance with Preparations 1 and 2.

The process of the present invention comprises subjecting 11-oxygenated 6α-methylprogesterone (I), wherein the 11-oxygen substituent is selected from the group consisting of β-hydroxy and keto, to microbiological hydroxylation to obtain the corresponding 11-oxygenated 6α-methyl-16α-hydroxyprogesterone (II), then treating the resulting 11 - oxygenated 6α - methyl-16α-hydroxyprogesterone with an acylating agent, e. g. an acid halide or anhydride of a hydrocarbon carboxylic acid containing from one to twelve carbon atoms, inclusive.

In the bioconversion step of the present invention, the operational conditions and reaction procedure and details may be those already known in the art of steroid bioconversion as illustrated by the Murray et al. U. S. Patent 2,602,769, issued July 8, 1952, utilizing, however, the action of an organism of the genus Streptomyces. Among the species which are useful in the fermentation step of the present invention are Streptomyces roseochromogenus (Waksman collection 3689), Streptomyces sp. (A. T. C. C. 11009), and Streptomyces roseochromogenus (A. T. C. C. 3347).

The selected species of actinomycete is grown on a medium suitably containing assimilable non-steroidal carbon, illustratively carbohydrates, such as dextrose; assimilable nitrogen, illustratively soluble or insoluble proteins, peptones or amino acids; and mineral constituents, illustratively sodium or ammonium phosphate and magnesium sulfate. The medium may desirably have a pH before inoculation of between about 6.5 to about 7.8 though a higher or lower pH may be used. A pH of between about 6.8 and about 7.4 is preferred for the growth of actinomycetes and a temperature range is from about 20 to about 35 degrees centigrade with about 20 to 32 degrees centigrade preferred.

The growth period required before the steroid to be fermented is exposed to the actinomycete does not appear to be critical, for example, the steroid may be added either before sterilization of the medium, at the time of inoculating the medium or at sometime, for example, 24 or 48 hours later. The addition of steroid substrate to be fermented may be accomplished in any suitable manner, such as by dispersing the steroid substrate, either alone with a dispersing agent, or in solution in an organic solvent. Either submerged or surface culture procedures may be used with facility, although submerged culture is preferred.

The temperature during the period of fermentation of the steroid may be the same as that found suitable for the growth of the organism. It need be maintained only within such range as supports life, active growth, or the enzyme activity of the streptomycete.

The time required for the fermentation of steroid varies somewhat with the procedure. When the steroid is added to the actinomycete after substantial growth of the organism, for example, after sixteen to 24 hours at optimum temperature, the conversion of steroid substrate begins immediately and is substantially complete in from two to ten days, five days being generally satisfactory.

After completion of the steroid fermentation, the resulting transformed steroid is recovered from the fermentation reaction mixture by extracting the fermentation reaction mixture, including the fermentation liquor and mycelium with an organic solvent for steroids, for example, methyl isopropyl ketone, methylene chloride, chloroform, carbon tetrachloride, ethylene chloride, trichloroethylene, ether, amyl acetate, benzene, and the like.

The fermentation liquor and mycelium can be separated and then separately extracted with suitable solvents. The extracts can be combined, either before or after washing with an alkaline solution, illustratively sodium bicarbonate, suitably dried, as for example, over anhydrous sodium sulfate, and the resulting purified transformed steroid obtained by recrystallization from organic solvents, by trituration or by chromatography in order to isolate the thus obtained steroids from the other transformation products.

Subjecting 6α-methyl-11β-hydroxyprogesterone to the above bioconversion procedure is productive of 6α-methyl-11β,16α-dihydroxyprogesterone. Similarly, subjecting 6α-methyl-11-ketoprogesterone to the above fermentation procedure is productive of 6α-methyl-16α-hydroxy-11-ketoprogesterone. Esterification of 11-oxygenated 6α-methyl-16α-hydroxyprogesterone to produce the corresponding 16-acylates can be performed under esterification conditions known in the art, e. g., by the reaction of the 16α-hydroxysteroid with an acylating agent such as an acid anhydride, acid chloride or bromide, or a ketene of a hydrocarbon carboxylic acid, or by reaction with the selected acid in the presence of an esterification catalyst, or with an ester under ester exchange reaction conditions. Reaction conditions which are apt to affect a labile 11β-hydroxy group should be avoided. Compounds thus produced include the 16α-acyloxy compounds wherein the acyl radical is that of an organic acid, preferably a hydrocarbon carboxylic acid containing from one to twelve carbon atoms inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, succinic, a cyclic acid, e. g., cyclopropylideneacetic, cyclopentylformic, cyclopentylacetic, β-cyclohexylpropionic, cyclohexylformic, cyclohexylacetic, an aryl or alkaryl acid, e. g., benzoic, 2-, 3- or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, an unsaturated acid, e. g., acrylic, maleic, vinyl acetic, propiolic, undecolic, etc. Use of an excess of acylating reagent in the reaction is preferred unless conditions are such that an 11β-hydroxy group tends to be esterified. The 11β-hydroxy group is not esterified under normal acylation conditions. Solvents which are frequently employed in carrying out the acylating process include benzene, toluene, acetic acid, pyridine, and the like. Preferably the acylation is carried out at about room temperature or somewhat above to minimize decomposition of the starting steroid or product, although higher and lower temperatures, e. g., from about zero degrees centigrade to the boiling point of the reaction mixture may also be used. Isolation of the 16-acylated product is conveniently achieved by adding a large volume of water to the reaction mixture if the reaction solvent is water miscible and thus precipitating the product, or if the solvent is water immiscible by distilling the solvent from the reaction mixture at reduced pressure to leave a residue consisting essentially of the desired product. Illustrative of the esters thus produced are 6α-methyl-11β,16α-dihydroxyprogesterone 16-acetate, 6α-methyl-16α-hydroxy-11-ketoprogesterone 16-acetate, and the like.

The following preparations and examples are illustrative of the product and process of the present invention and are not to be construed as limiting.

PREPARATION 1

*11-keto-6β-methylprogesterone 3,20-bis-(ethylene ketal)*

A mixture of five grams of 11-keto-6β-methylprogesterone [Spero et al., J. Am. Chem. Soc., 78, 6213 (1956)], 503 milliliters of benzene, 26 milliliters of ethylene glycol, and 0.152 gram of paratoluenesulfonic acid monohydrate was stirred and heated under reflux for 22 hours while water was removed by means of a water trap. The reaction mixture was then cooled to thirty degrees centigrade, 0.4 milliliter of pyridine was added, and stirring was continued for ten minutes. The reaction mixture was then shaken with 110 milliliters of water and the organic and aqeous layers separated. The organic layer was dried over sodium sulfate and evaporated under diminished pressure giving a residue. The thus obtained residue was recrystallized from methanol giving 2.68 grams of 11-keto-6β-methylprogesterone 3,20-bis (ethylene ketal) having a melting point of 168 to 175 degrees centigrade.

PREPARATION 2

*11β-hydroxy-6α-methylprogesterone*

A mixture of 2.68 grams of 11-keto-6β-methylprogesterone 3,20-bis-(ethylene ketal), 161 milliliters of tetrahydrofuran (previously distilled from lithium aluminum hydride) 1.34 grams of lithium aluminum hydride and 14.5 milliliters of absolute ether was stirred and refluxed under nitrogen for 1.5 hours, then 27 milliliters of water was added cautiously, to decompose excess hydride. The resulting mixture was filtered and the filter cake was washed with 135 milliliters of ether. The combined filtrate and wash was shaken with 135 milliliters of water and separated. The aqueous layer was washed with four 55-milliliter portions of ether, then the organic layer and the washes were combined, washed once with water, and evaporated to dryness under diminished pressure leaving a tan residue. The thus obtained residue was dissolved in a mixture of 268 milliliters of methanol and 26.8 milliliters of three normal aqueous sulfuric acid and heated under reflux for forty minutes, with a color change from yellow to green. The reaction mixture was then cooled, neutralized by addition of 127 milliliters of five percent sodium bicarbonate solution, and concentrated under reduced pressure until almost all the methanol was removed. The resulting solid was removed by filtration, washed with water, dried, and twice crystallized from ethyl acetate to give 1.1 grams of 11β-hydroxy-6α-methylprogesterone having a melting point of 155 to 158 degrees centigrade, a rotation, $[\alpha]_D$, of plus 189 degrees in chloroform, and the following analysis:

*Analysis.*—Calculated for $C_{22}H_{32}O_3$: C, 76.70; H, 9.36. Found: C, 76.58; H, 9.14.

EXAMPLE 1

*6α-methyl-11β,16α-dihydroxy-4-pregnene-3,20-dione*

One hundred milliliters of two percent cornsteep liquor of sixty percent solids was adjusted to pH of 6.8 to 7.4 with sodium hydroxide and was sterilized at fifteen pounds pressure for thirty minutes. To this was added a similarly sterile solution of two grams of Cerelose (technical grade of dextrose) in four milliliters of water. This sterile medium was inoculated with a suspension of spores and mycelium of *Streptomyces roseochromogenus* (Waksman Collection No. 3689) and was agitated on a rotatory shaker for a period of 24 hours by which time a good growth of the organism had taken place. To this 24 hour culture twenty milligrams of 6α-methyl-11β-hydroxy-4-pregnene-3,20-dione dissolved in 0.2 milliliter of dimethylformamide was added. Incubation of the steroid with the microorganism was maintained (with agitation) for five days, at which time the pH was 8.6. The fermentation broth was then separated into the mycelium and the beer by centrifugation. The mycelium was extracted first with two 25-milliliter portions of acetone and then with four successive 25-milliliter portions of methyl isopropyl ketone. The beer was also extracted with four successive 25-milliliter portions of methyl isopropyl ketone. All of the extracts were combined, washed with two percent aqueous sodium bicarbonate solution and with water, dried with anhydrous sodium sulfate, and evaporated to dryness. The residue, which on paper chromatogram analysis showed the presence of 6α-methyl-11β,16α-dihydroxy-4-pregnene-3,20-dione, was purified by chromatography over synthetic magnesium silicate (Florisil) and crystallization from acetone to give 6α-methyl - 11β, 16α - dihydroxy - 4 - pregnene - 3, 20-dione.

EXAMPLE 2
*6α-methyl-16α-hydroxy-4-pregnene-3,11,20-trione*

In the same manner as given in Example 1, subjecting 6α-methyl-4-pregnene-3,11,20-trione to the action of *Streptomyces roseochromogenus* (Waksman Collection No. 3689) is productive of 6α-methyl-16α-hydroxy-4-pregnene-3,11,20-trione.

EXAMPLE 3
*6α-methyl-11β,16α-dihydroxy-4-pregnene-3,20-dione 16-acetate*

A solution of one gram of 6α-methyl-11β,16α-dihydroxy-4-pregnene-3,20-dione in a mixture of five milliliters of pyridine and five milliliters of acetic anhydride is allowed to stand for eighteen hours at room temperature then is poured into a large volume of ice-water giving a precipitate of crude 6α-methyl-11β,16α-dihydroxy-4-pregnene-3,20-dione 16-acetate. The thus obtained 16-acetate is purified by crystallization from acetone.

In the same manner as given above, treating 6α-methyl-11β,16α-dihydroxy-4-pregnene-3,20-dione in pyridine solution with the acid anhydride, bromide, or chloride of an organic carboxylic acid, preferably a hydrocarbon carboxylic acid containing from one to twelve carbon atoms inclusive, is productive of the corresponding 16-esters, for example, 6α-methyl-11β,16α-dihydroxy-4-pregnene-3,20 - dione 16 - propionate, 6α - methyl - 11β,16α-dihydroxy - 4 - pregnene - 3,20 - dione 16 - butyrate, 6α - methyl - 11β,16α - dihydroxy - 4 - pregnene - 3,20-dione 16 - isobutyrate, 6α - methyl - 11β,16α - dihydroxy - 4 pregnene - 3,20 - dione 16 - valerate, 6α-methyl - 11β,16α - dihydroxy - 4 - pregnene - 3,20 - dione 16 - isovalerate, 6α - methyl - 11β,16α - dihydroxy - 4-pregnene - 3,20 - dione 16 - trimethylacetate, 6α - methyl - 11β,16α - dihydroxy - 4 pregnene - 3,20 - dione 16 - (2 - methylbutyrate), 6α - methyl - 11β,16α - dihydroxy - 4 - pregnene - 3,20 - dione 16 - (3 - ethylbutyrate), 6α - methyl - 11β,16α - dihydroxy - 4 - pregnene - 3,20 - dione 16 - hexanoate, 6α-methyl - 11β, 16α - dihydroxy - 4 - pregnene - 3,20 - dione 16 - diethylacetate, 6α - methyl - 11β,16α - dihydroxy - 4-pregnene - 3,20 - dione 16 - triethylacetate, 6α - methyl-11β,16α - dihydroxy - 4 - pregnene - 3,20 - dione 16-heptanoate, 6α - methyl - 11β,16α - dihydroxy - 4-pregnene-3,20-dione 16-octanoate, 6α-methyl-11β,16α-dihydroxy-4-pregnene-3,20-dione 16α-ethylisovalerate, 6α-methyl - 11β,16α - dihydroxy - 4 - pregnene - 3,20 - dione 16 - hemisuccinate, 6α - methyl - 11β,16α - dihydroxy-4 - pregnene - 3,20 - dione 16 - cyclopropylideneacetate, 6α - methyl - 11β,16α - dihydroxy - 4 - pregnene - 3,20-dione 16 - cyclopentylformate, 6α - methyl - 11β,16α-dihydroxy - 4 - pregnene - 3,20 - dione 16 - cyclopentylacetate, 6α - methyl - 11β,16α - dihydroxy - 4 - pregnene-3,20 - dione 16β - cyclohexylpropionate, 6α - methyl-11β,16α - dihydroxy - 4 - pregnene - 3,20 - dione 16-cyclohexylformate, 6α - methyl - 11β,16α - dihydroxy - 4-pregnene - 3,20 - dione 16 - cyclohexylacetate, 6α-methyl - 11β,16α - dihydroxy - 4 - pregnene - 3,20 - dione 16 - benzoate, 6α - methyl - 11β,16α - dihydroxy - 4-pregnene - 3,20 - dione 16 - (2 - methylbenzoate), 6α-methyl - 11β,16α - dihydroxy - 4 - pregnene - 3,20 - dione 16 - (3 - methylbenzoate), 6α - methyl - 11β,16α - dihydroxy - 4 - pregnene - 3,20 - dione 16 - (4 - methylbenzoate), 6α - methyl - 11β,16α - dihydroxy - 4 - pregnene - 3,20 - dione 16 - (2,3 - dimethylbenzoate), 6α - methyl - 11β,16α - dihydroxy - 4 - pregnene - 3,20 - dione 16 - (2,4 - dimethylbenzoate), 6α - methyl - 11β,16α-dihydroxy - 4 - pregnene - 3,20 - dione 16 - (2,5 - dimethylbenzoate), 6α - methyl - 11β,16α - dihydroxy - 4-pregnene - 3,20 - dione 16 - (3,4 - dimethylbenzoate), 6α - methyl - 11β,16α - dihydroxy - 4 - pregnene - 3,20-dione 16 - (3,5 - dimethylbenzoate), 6α - methyl - 11β, 16α - dihydroxy - 4 - pregnene - 3,20 - dione 16 - (2,4,6-trimethylbenzoate), 6α - methyl - 11β,16α - dihydroxy-4 - pregnene - 3,20 - dione 16 - (2 - ethylbenzoate), 6α-methyl - 11β,16α - dihydroxy - 4 - pregnene - 3,20 - dione 16 - (2,4,6 - triethylbenzoate), 6α - methyl - 11β,16α-dihydroxy - 4 - pregnene - 3,20 - dione 16α - naphthoate, 6α - methyl - 11β,16α - dihydroxy - 4 - pregnene - 3,20-dione 16 - (3 - methyl - α - naphthoate), 6α - methyl-11β,16α - dihydroxy - 4 - pregnene - 3,20 - dione 16-phenylacetate, 6α - methyl - 11β,16α - dihydroxy - 4-pregnene - 3,20 - dione 16 - phenylpropionate, 6α-methyl - 11β,16α - dihydroxy - 4 - pregnene - 3,20 - dione 16 - diphenylacetate, 6α - methyl - 11β,16α-dihydroxy-4 - pregnene - 3,20 - dione 16 - triphenylacetate, 6α-methyl - 11β,16α - dihydroxy - 4 - pregnene - 3,20 - dione 16 - acrylate, 6α - methyl - 11β,16α - dihydroxy - 4-pregnene - 3,20 - dione - 16 maleate, 6α - methyl - 11β, 16α - dihydroxy - 4 - pregnene - 3,20 - dione - 16 - vinylacetate, 6α - methyl - 11β,16α - dihydroxy - 4 - pregnene-3,20 - dione - 16 - propiolate, 6α - methyl - 11β,16α-dihydroxy - 4 - pregnene - 3,20 - dione 16 - undecolate, and the like.

EXAMPLE 4
*6α-methyl-16α-hydroxy-4-pregnene-3,11,20-trione 16-acetate*

In the same manner as given in Example 3, treating 6α - methyl - 16α - hydroxy - 4 - pregnene - 3,11,20 - trione with acetic anhydride and pyridine is productive of 6α-methyl - 16α - hydroxy - 4 - pregnene - 3,11,20 - trione 16-acetate.

Similarly, in the same manner as given in Example 3, treating 6α - methyl - 16α - hydroxy - 4 - pregnene-3,11,20-trione with an acid anhydride of an organic carboxylic acid, preferably a hydrocarbon carboxylic acid containing from one to twelve carbon atoms, inclusive, is productive of the corresponding 6α-methyl-16α-hydroxy-4-pregnene-3,11,20-trione 16-acylate. The preferred 16-acylates are those corresponding to the acylates described above for 6α-methyl-11β,16α-dihydroxy-4-pregnene-3,20-dione.

It is to be understood that the invention is not to be limited to the exact details of operation or exact compounds shown and described, as obvious modifications and equivalents will be apparent to one skilled in the art; the invention is therefore to be limited only by the scope of the appended claims.

We claim:

1. A 16-oxygenated steroid of the formula:

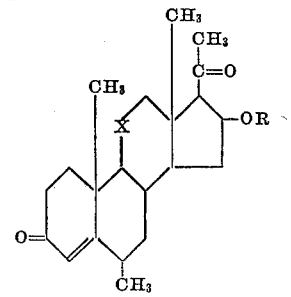

wherein X is selected from the group consisting of the carbonyl radical and the β-hydroxymethylene radical and R is selected from the group consisting of hydrogen and the acyl radical of a hydrocarbon carboxylic acid containing from one to twelve carbon atoms, inclusive.

2. 6α-methyl-11β,16α-dihydroxyprogesterone.
3. 6α - methyl - 11β,16α-dihydroxyprogesterone 16-acetate.
4. 6α-methyl-16α-hydroxy-11-ketoprogesterone.
5. 6α-methyl-16α-hydroxy-11-ketoprogesterone acetate.

No references cited.